United States Patent [19]

Antonini

[11] Patent Number: 5,597,168
[45] Date of Patent: Jan. 28, 1997

[54] SINGLE SPLIT OIL SEAL

[75] Inventor: Joe Antonini, Chicago, Ill.

[73] Assignee: Dana Corporation, Toledo, Ohio

[21] Appl. No.: 609,096

[22] Filed: Feb. 29, 1996

Related U.S. Application Data

[63] Continuation of Ser. No. 365,713, Dec. 28, 1994, abandoned.

[51] Int. Cl.$^6$ ........................................................ F16J 9/06
[52] U.S. Cl. ............................ 277/152; 277/164; 277/216
[58] Field of Search .................................... 277/171, 133, 277/95, 152, 164, 216, 207 R, 235 R, 220, 222, 156, 163

[56] References Cited

U.S. PATENT DOCUMENTS

| | | | |
|---|---|---|---|
| 2,210,723 | 8/1940 | Kosatka | 277/227 |
| 2,731,284 | 1/1956 | Chambers et al. | 288/11 |
| 3,106,406 | 6/1960 | Liebig | 277/171 |
| 3,180,650 | 4/1965 | Liebig | 277/235 R |
| 3,700,296 | 10/1972 | Bugmann | 277/95 |
| 3,827,703 | 8/1974 | Brink . | |
| 4,629,200 | 12/1986 | Ruddy | 277/216 |
| 4,739,997 | 4/1988 | Smetana | 277/216 |

FOREIGN PATENT DOCUMENTS

| | | | |
|---|---|---|---|
| 0197725 | 10/1986 | European Pat. Off. . | |
| 851970 | 10/1960 | United Kingdom | 277/84 |
| 1091388 | 11/1967 | United Kingdom . | |

*Primary Examiner*—Daniel G. DePumpo
*Attorney, Agent, or Firm*—Rader, Fishman & Grauer PLLC

[57] ABSTRACT

A single split oil seal is disposed between and completely encircles a rotating journal and a corresponding journal case to prevent unwanted fluid leakage. The seal includes an annular seal body with an inner radial periphery and an outer radial periphery. A lip is integrally joined to the seal body at the inner radial periphery of the seal body and extends radially inwardly to sealingly engage the journal. An annular retaining ring such as a garter spring is embedded in the seal body which urges the seal body radially outwardly to sealingly engage the case. The retaining ring has unassembled ends, the seal body including a single split extending radially between the unassembled ends.

21 Claims, 1 Drawing Sheet

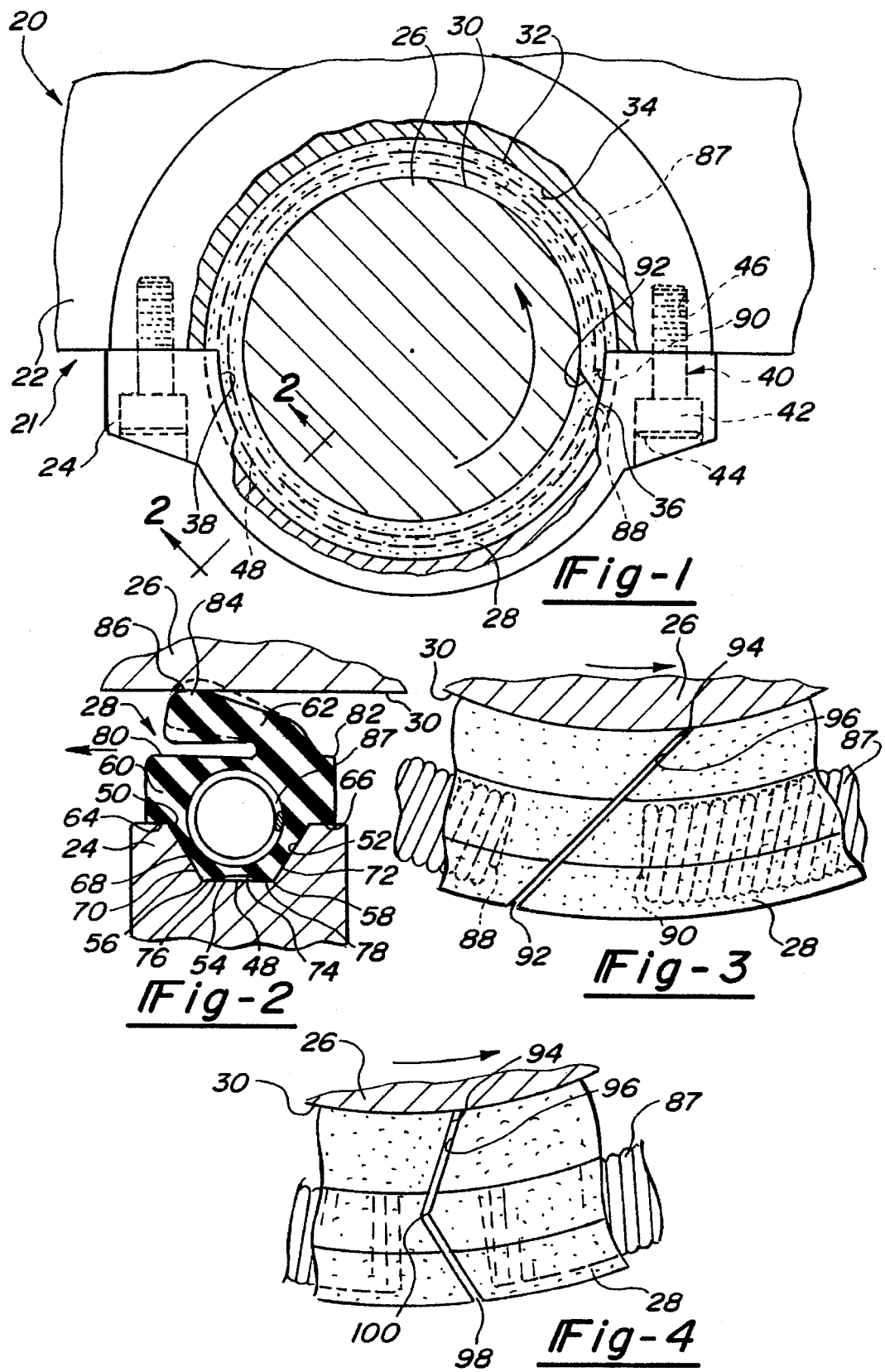

SINGLE SPLIT OIL SEAL

This application is a continuation of application Ser. No. 08/365,713 filed on Dec. 28, 1994, now abandoned.

FIELD OF THE INVENTION

The present invention relates to fluid seals and in particular to fluid seals disposed between rotating journals and corresponding journal cases.

BACKGROUND OF THE INVENTION

Fluid seals are used to seal between a cylindrical journal such as a crankshaft of an internal combustion engine and a journal case such as a crankcase. The crankshaft is received in a crankcase comprising an engine block (or cylinder block) and a bearing cap fastened to the block. A top half of the crankshaft is received in a generally half-cylindrical shaped opening of the block with a bottom half of the crankshaft received in a mating opening of the bearing cap. A fluid seal is received in both openings between the crankcase and crankshaft and prevents the leakage of engine oil from the engine while permitting crankshaft rotation.

One known fluid seal used in an environment such as the crankcase of an internal combustion engine is a so-called "rope" seal, commonly known as a jute. Typically, a first rope half seal is received in an annular seal groove of the block and a second rope half seal is received in a mating annular seal groove of the cap. Trimming operations are generally required to remove excess portions of the half seals. Finally, the cap is fastened to the block. Until the late 1980's rope seals were formed from woven asbestos and non-asbestos materials. While always difficult to install, the use of asbestos aided in assembly and helped to generally provide an acceptable seal when properly positioned in the crankcase. However, since rope seals have been formed from solely non-asbestos materials, assembly has become even more difficult because the non-asbestos material is much harder and not as pliable.

A second known fluid seal is a split seal. A split seal is made up of two half seals molded to a metal reinforcement. The first half seal is received in a groove of the block and the second half seal is received in a groove of the cap. The cap and block are then fastened together. Such a seal is expensive and difficult to produce, requiring sophisticated tooling and tight tolerances. Additionally, both rope seals and split seals have at least two points of discontinuity where the half seals mate with one another, enhancing the chance for unwanted fluid leakage from the crankcase as the crankshaft rotates.

SUMMARY OF THE INVENTION

The present invention is directed to a single split oil seal for use with rotating journals such as the crankshaft of an internal combustion engine. The inventive seal has better sealability at lower cost than known prior art seals and is easily modified for different applications.

The journal is received in a case having an opening defined by an inner periphery. The case also includes an annular groove extending radially outwardly of the inner periphery. The flexible fluid seal is disposed between and completely encircles both the rotating journal and the groove of the case. It includes a seal body with an inner radial periphery and an outer radial periphery. A lip is integrally joined to the seal body at the inner radial periphery of the seal body and extends radially inwardly to a distal end. The distal end sealingly engages the journal. The lip has a diameter smaller than the sealing surface of the journal when the lip is in an undeformed state such that the lip is radially compressed and yieldably urged to improve sealing engagement between the lip and the journal.

The seal body further includes two radially outer shoulders adjacent the outer periphery of the case and a radially outwardly extending base disposed between them. The base is received in the groove of the case.

An annular flexible retaining ring such as a garter spring is embedded in the seal body, and unlike known prior art seals, urges the seal body radially outwardly to promote sealing engagement between the base and the groove of the case. The retaining ring preferably includes unassembled ends. The seal has a single split extending radially between the unassembled ends, preventing unwanted sealing interference from the retaining ring ends while promoting assembly of the seal onto the journal and into the case.

In one embodiment, the split is angled between approximately fifteen (15) and thirty (30) degrees with respect to a radially extending axis to bring the ends of the seal into closer abutment along an increased area of contact. Thus, sealability is improved while preventing any interference from the retaining ring ends. In an alternative embodiment, the split has a generally V shape with an apex generally centered on a radial midpoint of the seal.

The inventive assembly has a number of advantages over the known prior art. By having only the single described split and encircling both the journal and case groove, the seal provides better sealability between the journal and case than seals requiring more than one split. The seal is also easily modified for different environments. Further, by having one integral component, the seal is easier and less expensive to manufacture and install than seals of the prior art.

BRIEF DESCRIPTION OF THE DRAWINGS

Features and inventive aspects of the present invention will become more apparent upon reading the following detailed description, claims, and drawings, of which the following is a brief description:

FIG. 1 is a cross-sectional view of a crankcase assembly incorporating the present invention.

FIG. 2 is a cross-sectional view of an embodiment of the present invention taken along line 2—2 of FIG. 1.

FIG. 3 is a fragmentary cross-sectional view of the present invention showing an angled split.

FIG. 4 is a fragmentary cross-sectional view of an alternative embodiment of the present invention showing a double angled split.

DETAILED DESCRIPTION OF A PREFERRED EMBODIMENT

A journal seal assembly 20 is illustrated in FIG. 1. Assembly 20 comprises a case 21 including a cylinder block or an engine block 22, a bearing cap 24, a journal or crankshaft 26, and a single split fluid seal 28.

Crankshaft 26 has an outer peripheral surface 30, generally half of which is received in a generally half-cylindrical shaped opening 32 of block 22, opening 32 defined by an inner periphery 34. The remainder of crankshaft 26 is received in a mating half-cylindrical opening 36 of bearing cap 24, opening 36 defined by an inner periphery 38. Bearing cap 24 is secured to block 22 using a plurality of fasteners 40 such as threaded bolts 42 inserted through counterbores 44 of bearing cap 24 to threadingly engage mating bores 46 of block 22.

Fluid seal 28 is disposed between outer peripheral surface 30 and inner peripheries 34 and 38 of block 22 and bearing cap 24 of case 21, respectively. Seal 28 completely encircles both crankshaft 26 and the opening in case 21. As shown in FIG. 2, seal 28 is received in a generally trapezoidal groove 48 extending about inner periphery 34 of block 22 and inner periphery 38 of bearing cap 24. Groove 48 has two radially directed side walls 50 and 52 sloping toward one another and merging into a bottom wall 54 at corners 56 and 58.

Fluid seal 28 is designed to fit snugly within grove 48, and includes both a main seal body 60 and an integral lip 62. Fluid seal 28 is preferably composed of an elastomeric material with resistance to lubrication oil. Disposed on either side of groove 48, seal body 60 has two radially outer shoulders 64 and 66 in contact with either inner periphery 34 or 38 and a radially outwardly extending base 68 disposed between them. Base 68 includes two side surfaces 70 and 72 conforming to side walls 50 and 52, and an outer periphery 74. Outer periphery 74 includes two annular beads 76 and 78 projecting radially outwardly that are flush with side surfaces 66 and 68, respectively, and in contact with bottom wall 54 at corners 56 and 58. Shoulders 64 and 66, side surfaces 70 and 72, and beads 76 and 78 of outer periphery 74 work in combination to sealingly engage groove 48 to prevent the unwanted passage of oil about outer periphery 74 of fluid seal 28.

Lip 62 is integrally joined to seal body 60 at an inner periphery 80 adjacent one axial end 82 and extends radially inwardly in a cantilevered fashion along a substantial portion of the circumferential length of seal body 60. Lip 62 ends at a distal end 84 that defines an annular sealing surface 86 which sealingly engages and encircles peripheral sealing surface 30 of crankshaft 26. As shown in phantom, in an undeformed orientation, lip 64 has a diameter smaller than surface 30 of crankshaft 26. When installed, lip 62 is radially compressed and yieldably urged against sealing surface 30, increasing the area of contact between lip 62 and sealing surface 30. As a result, there is improved sealing engagement between seal 28 and crankshaft 26. Improved sealability also results by having distal end 84 pointing toward the front of the engine, as shown by the arrow in FIG. 2 since the direction of fluid flow is typically from the front of the engine toward seal 28. The fluid becomes trapped between seal body 60 and lip 62, further urging lip 62 into sealing engagement with crankshaft 26.

The interaction between lip 62 and surface 30 of crankshaft 26 may also help seat seal 28 within groove 48. Preferably, however, seal 28 also includes a flexible annular retaining ring such as garter spring 87 embedded within seal body 60. Garter spring 87 is sized to push base 68 radially outwardly to brine outer periphery 74 into increased compressive engagement with groove 48, providing better contact and improved sealability between block 22 or bearing cap 24 and seal 28. Further, by limiting the radial movement of seal 28 toward crankshaft 26, wear to lip 62 is reduced, increasing seal life. The use of garter spring 87 to push seal 28 radially outwardly constitutes a different use from those known to the inventor, wherein garter springs keep an inside diameter of the seal in closer proximity to the crankshaft.

As illustrated in FIG. 2, it is not required that the elastomeric material of fluid seal 28 extend to the interior of garter spring 87. Yet, depending on the nature of spring 87 and in particular the spacing between the various loops of the spring, the elastomeric material may extend into the interior of the spring.

Crankcase seal assembly 20 only requires one sealing element, fluid seal 28. Fluid seal 28 is a single split fluid seal. Having only single split 92 and encircling both crankshaft 26 and groove 48 of case 21, seal 28 provides a better seal between crankshaft 26 and case 21 than seals requiring more than one split. Seal 28 is preferably manufactured as illustrated in FIGS. 1, 3, and 4, such that spring 87 has its ends 88 and 90 unassembled. Then a cut or split 92 may be made through the elastomeric material. Thus, seal 28 is easily manufactured and modified for particular applications.

The installation of fluid seal 28 is also easy. There are no half seals to be trimmed or aligned. Instead, seal 28 is simply deformed as necessary, and positioned within groove 48 and onto crankshaft 26. Preferably, as shown in FIG. 1, split 92 is positioned near one of fasteners 40, but slightly offset from the point of connection between block 22 and bearing cap 34. Such positioning allows split 92 to take advantage of a portion of the clamping load between bearing cap 34 and block 22, improving the sealability of seal 28.

Sealability is also improved by placing elastomeric material along the entire length of split 92, as shown in FIGS. 1, 3, and 4. Otherwise, a gap may be created along split 92 as exposed ends of spring 87 come into contact with one another. The elastomeric material also protects garter spring 87 from the adverse environment of the journal seal assembly 20.

In one embodiment, split 92 extends radially. Preferably, however, split 92 is angled between approximately fifteen (15) and thirty (30) degrees with respect to a radially extending axis, the angular direction of the split corresponding to the direction of rotation of crankshaft 26. Thus, as shown in FIG. 3, split 92 is to the right of a radially extending axis meaning that crankshaft 26 is intended to move counterclockwise, as shown by the arrow. By angling split 92 in such a manner, the natural pressure of crankshaft 26 toward seal 28 created by the rotation of crankshaft 26 brings seal ends 94 and 96 into closer abutment along an increased area of contact. Thus, the sealability of seal 28 is further improved.

FIG. 4 shows an alternative to a single angled split 92, a double angle split 98, having a general V shape with apex 100 generally centered on the radial midpoint of seal 28. Preferably, split 98 opens up in the direction of rotation of crankshaft 26, as shown by the arrow. By angling split 98 in such a manner, ends 94 and 96 are also brought into closer abutment along an increased area of contact, again improving the sealability of seal 28.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A flexible fluid seal adapted to be disposed between and entirely encircle a rotating journal and a journal case, comprising:

a single annular seal body with an inner radial periphery and an outer radial periphery having only one split between said inner and outer peripheries;

a lip integrally joined to said seal body at said inner radial periphery and extending radially inwardly to a distal end, said distal end adapted to sealingly engage the journal; and an annular retaining ring embedded in said seal body adapted to urge said seal body radially outwardly to sealingly engage the case.

2. A flexible fluid seal as recited in claim 1, wherein said retaining ring has unassembled ends, said split of said seal body extending radially between said unassembled ends.

3. A flexible fluid seal as recited in claim 2, wherein said retaining ring is a garter spring.

4. A flexible fluid seal as recited in claim 2, wherein said split is angled between approximately fifteen (15) and thirty (30) degrees with respect to a radially extending axis, opposing faces of said seal body defining said split having a common angle.

5. A flexible fluid seal as recited in claim 4, wherein an angular direction of said split corresponds to a direction of rotation of said journal.

6. A flexible fluid seal as recited in claim 2, wherein said split has a generally V shape with an apex generally centered on a radial midpoint of said seal.

7. A flexible fluid seal as recited in claim 2, wherein said lip is adapted in an undeformed state to have a diameter smaller than an outer peripheral surface of the journal such that said lip may be radially compressed and yieldably urged to improve sealing engagement.

8. A flexible fluid seal as recited in claim 2, wherein said seal body includes two radially outer shoulders adapted to contact an inner periphery of the case and a radially outwardly extending base disposed between them, said base adapted to be received in a groove of the case.

9. A journal seal assembly comprising:

a case with an annular inner periphery defining an opening;

a rotatable annular journal received in said opening, said journal having a sealing surface encircling an outer periphery; and a flexible fluid seal including a single annular seal body with an inner radial periphery and an outer radial periphery having only one split between said inner and outer peripheries, said seal disposed between and entirely encircling said sealing surface of said journal and said inner periphery of said case, a lip integrally joined to said seal body at said inner radial periphery of said seal body adjacent one axial end of said seal body and extending radially inwardly to a distal end, said distal end sealingly engaging said sealing surface of said journal, and an annular retaining ring embedded in said seal body to urge said seal body radially outwardly to promote sealing engagement between said outer periphery of said seal body and said case.

10. An assembly as recited in claim 9, wherein said retaining ring includes unassembled ends, said split of said seal body extending radially between said unassembled ends.

11. An assembly as recited in claim 10, wherein said retaining ring is a garter spring.

12. An assembly as recited in claim 10, wherein said split is angled between approximately fifteen (15) and thirty (30) degrees with respect to a radially extending axis, opposing faces of said seal body defining said split having a common angle.

13. An assembly as recited in claim 10, wherein said split has a generally V shape with an apex generally centered on a radial midpoint of said seal, said seal opening up in a direction of rotation of said journal.

14. An assembly as recited in claim 10, said lip having a diameter smaller than said sealing surface of said journal when said lip is in an undeformed state, said lip radially compressed and yieldably urged to improve sealing engagement between said lip and said journal.

15. An assembly as recited in claim 10, said case including an annular groove, and wherein said seal body includes two radially outer shoulders adapted to contact said inner periphery of the case and a radially outwardly extending base disposed between them, said base received in said groove of said case and compressed snugly by said retaining ring against said groove.

16. An assembly as recited in claim 15, wherein said base and said groove are generally trapezoidal.

17. An assembly as recited in claim 9, wherein said case comprises a block and a cap, said cap fastened to said block to form said case.

18. A journal seal assembly comprising:

a case with an annular inner periphery defining an opening, and an annular groove extending radially outwardly of said inner periphery;

a rotatable annular journal received in said opening, said journal having a sealing surface encircling an outer periphery; and a flexible fluid seal including a single annular seal body with an inner radial periphery and an outer radial periphery having only one split between said inner and outer peripheries, said seal disposed between and entirely encircling said sealing surface of said journal and said groove of said case, a lip integrally joined to said seal body at said inner radial periphery of said seal body adjacent one axial end of said seal body and extending radially inwardly to a distal end, said distal end sealingly engaging said sealing surface of said journal, said lip having a diameter smaller than said sealing surface of said journal when said lip is in an undeformed state such that said lip is radially compressed and yieldably urged to improve sealing engagement between said lip and said journal, said seal body further including two radially outer shoulders adjacent said inner periphery of the case and a radially outwardly extending base disposed between them, said base received in said groove of said case, and an annular garter spring embedded in said seal body to urge said seal body radially outwardly to promote sealing engagement between said base and said groove of said case.

19. An assembly as recited in claim 18, wherein said garter spring includes unassembled ends, said split of said seal body extending radially between said unassembled ends.

20. An assembly as recited in claim 18, wherein said split is angled between approximately fifteen (15) and thirty (30) degrees with respect to a radially extending axis, opposing faces of said seal body defining said split having a common angle.

21. An assembly as recited in claim 18, wherein said split has a generally V shape with an apex generally centered on a radial midpoint of said seal, said seal opening up in a direction of rotation of said journal.

* * * * *